Figure 1:
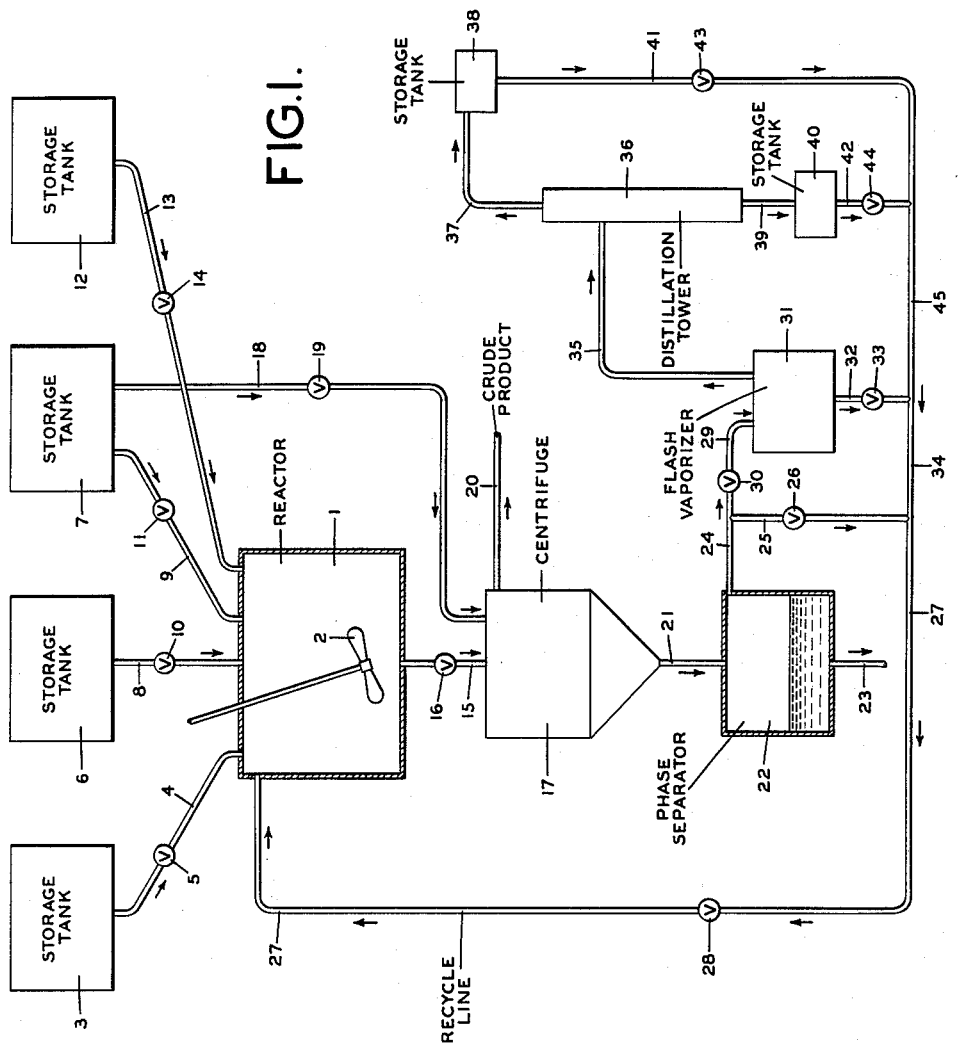

March 15, 1966  T. M. CAWTHON ETAL  3,240,755
PROCESS FOR THE PREPARATION OF POLYCARBONATES
Filed Dec. 29, 1960  2 Sheets-Sheet 1

INVENTORS
THOMAS M. CAWTHON
BRYCE C. OXENRIDER
LOGAN C. BOSTIAN
BY
ATTORNEY

March 15, 1966  T. M. CAWTHON ETAL  3,240,755
PROCESS FOR THE PREPARATION OF POLYCARBONATES
Filed Dec. 29, 1960  2 Sheets-Sheet 2

INVENTORS
THOMAS M. CAWTHON
BRYCE C. OXENRIDER
LOGAN C. BOSTIAN
BY
ATTORNEY

United States Patent Office 3,240,755
Patented Mar. 15, 1966

3,240,755
PROCESS FOR THE PREPARATION OF
POLYCARBONATES
Thomas M. Cawthon, Rockaway, Bryce C. Oxenrider, Florham Park, and Logan C. Bostian, Morristown, N.J., assignors to Allied Chemical Corporation, New York, N.Y., a corporation of New York
Filed Dec. 29, 1960, Ser. No. 79,348
10 Claims. (Cl. 260—47)

The present invention relates to a process for the preparation of polycarbonate resins by the phosgenation of 2,2-(4,4'-dihydroxy-diphenyl)-propane, also known as p,p'-isopropylidene-diphenol, hereinafter referred to as bis-phenol-A, in an aqueous alkaline medium and in the presence of a catalyst.

Polycarbonate resins may be conventionally prepared by introducing phosgene into an aqueous alkaline solution of bis-phenol-A at ambient temperatures, preferably in the presence of a catalyst and solvent for the polycarbonate resin which is formed. The solvent retains the polycarbonate resin in solution and molecular weight growth of the resin occurs in solution. After a molecular weight growth period the polycarbonate is recovered from solution, for example, by the addition of a non-solvent for the polycarbonate resin, thus precipitating the resin. If no solvent is employed only low molecular weight polymer is produced and this low molecular weight polymer precipitates from solution substantially as fast as formed.

The foregoing processes are subject to numerous disadvantages. The molecular weight of the recovered polycarbonate resin cannot be accurately reproduced. In addition, the foregoing processes produce polycarbonate resins having a broad molecular weight distribution, that is, not only is the average molecular weight of the resin unpredictable, but also the molecular weight distribution within the average covers a wide range of molecular weights. This molecular weight distribution is not desirable for numerous applications. A further disadvantage of the foregoing processes is the difficulty attendant upon scaling them up to a continuous, commercial operation.

The art has attempted to overcome the foregoing disadvantages by utilizing potential chain terminators in the process in order to control the molecular weight. Typical of such compounds are phenol, tertiary butyl phenol, chlorophenol, nonyl alcohol, butyl alcohol, etc. In order for these chain terminators to be effective it would be necessary for them to have similar solubility, partition co-efficient and reactivity as the monomer. Even if the chain terminator were effective, however, they would still not fully solve the problem, since they would merely limit the maximum molecular weight.

Accordingly it is an object of the present invention to provide a process for the preparation of polycarbonate resins by the phosgenation of bis-phenol-A.

It is a further object of the present invention to provide such a process which enables the attainment of uniform molecular weights.

It is still a further object of the present invention to provide such a process which is not subject to the art disadvantages of broad distribution of molecular weights.

It is a still further object of the present invention to provide a process for the preparation of polycarbonate resins by phosgenation of bis-phenol-A which inexpensively and expeditiously accomplishes the aforementioned objects continuously and reproducibly on any scale.

Further objects and advantages of the present invention will appear hereinafter.

In accordance with the present invention it has been found that polycarbonate resins may be obtained, which accomplish the aforementioned objects of the present invention, by reacting together phosgene and bis-phenol-A in an aqueous alkaline medium and in the presence of a partial solvent for the polycarbonate resin which precipitates the polycarbonate resin at a uniform molecular weight and which is a solvent for lower molecular weight polycarbonate resin and which is a non-solvent for higher molecular weight polycarbonate resin. The process of the present invention inexpensively enables the attainment of a wide range of products of pre-selected, uniform molecular weights. The particular molecular weight selected has a narrow molecular weight distribution. In the practice of the present invention, for example, a product may be obtained having a pre-selected molecular weight anywhere within the range of about 10,000 to 100,000. For most uses of the resins molecular weights of 20,000 to 60,000 are desired.

In the manufacture of any item requiring quality control, it is important to be assured of a reliable source of fabricating materials of uniform given molecular weight. This process is capable of assuring this uniformity for products of widely different molecular weights. At the same time, the molecular weight distribution is quite narrow with the elimination of substantially all of the higher molecular weight portion of the polymer. In many fabricating processes, the polymer is in the form of a viscous melt, for example, in extrusion or injection molding, or spinning of fibers from melts. The melt viscosity is greatly affected by the higher molecular weight portion, and its elimination results in greater ease of processing without detriment to the quality of the product. This uniformity in molecular weight is also desirable in the polycarbonates to be spun from solutions and in the preparation of coating compositions of the resin-in-solvent type.

The amount of partial solvent employed is not critical, but practically at least two and not more than 500 parts of partial solvent should be employed per part by weight of precipitated polycarbonate.

The partial solvents which may be employed in the present invention are generally those with precipitate the polycarbonate resin from solution at uniform molecular weights and which are solvents for molecular weights lower than the uniform molecular weight and which are non-solvents for molecular weights higher than the uniform molecular weight.

It has been generally found that compounds or mixtures of compounds which have a cohesive energy density (hereinafter referred to as C.E.D.) within the range of from about 65 to 82 may be utilized as partial solvents. The C.E.D. is an expression of the energy necessary to overcome the intermolecular forces between molecules. The C.E.D. of a compound may be calculated in accordance with the method outlined in J. Appl. Chem., 3, 71–80, Feb. 1953, "Some Factors Affecting the Solubility of Polymers," by P. A. Small.

In addition the compounds employed as partial solvents should not be water miscible, should be substantially inert under the conditions of the reaction and should have a sufficiently high boiling point to allow for reaction at elevated temperatures, if desired; preferably a boiling point of from 30° C. to 100° C. The partial solvent may be a single compound, or it may be a mixture of two or more compounds. It is preferred in the present invention to employ as a partial solvent a mixture of a solvent and a non-solvent, the C.E.D. of the solvent-non-solvent mixture being within the aforementioned range. The reason the mixture of solvent-non-solvent is preferred is that it provides more flexibility to the process, that is by varying the solvent-non-solvent ratio different uniform molecular weights may be obtained. It has been generally found that compounds which have a C.E.D. of from about 65 to 150 may be most suitably employed as solvents in the solvent-non-solvent mixture; similarly, it has been generally found that compounds which have a C.E.D. of from about 30 to 65 may be most suitably employed as non-solvents in the solvent-non-solvent mixture.

Typical partial solvents which have a C.E.D. within the above range and which may be employed in the present invention include butyl chloride, C.E.D. 71.06, amyl chloride, C.E.D. 70.9, n-propyl chloride, C.E.D. 72.4, etc. Typical solvents which may be employed in the solvent-non-solvent mixture include: the chlorinated aliphatic saturated hydrocarbons, such as methylene chloride, C.E.D. 102.7, ethylene chloride, C.E.D. 104.73, 1,4-dichlorobutane, C.E.D. 92.73; aromatic compounds such as benzene, C.E.D. 89, xylene, C.E.D. 84; etc. Typical non-solvents which may be employed include: the aliphatic saturated ethers, such as isopropylether, C.E.D. 48.67, n-butylether, C.E.D. 58.57; aliphatic hydrocarbons such as isooctane, C.E.D. 47.50, heptane, C.E.D. 55.64; etc. When a solvent-non-solvent mixture is employed as the partial solvent, mixtures of two or more solvents may be utilized as the solvent portion or mixtures of two or more non-solvents may be employed as the non-solvent portion. It has generally been found that when a solvent-non-solvent mixture is employed any ratio of solvent to non-solvent may be employed, provided the resultant mixture has a C.E.D. within the aforementioned range.

The present invention will be more readily apparent from a consideration of the appended drawings.

FIGURE 1 diagrammatically illustrates the process of the present invention.

Figure 2:
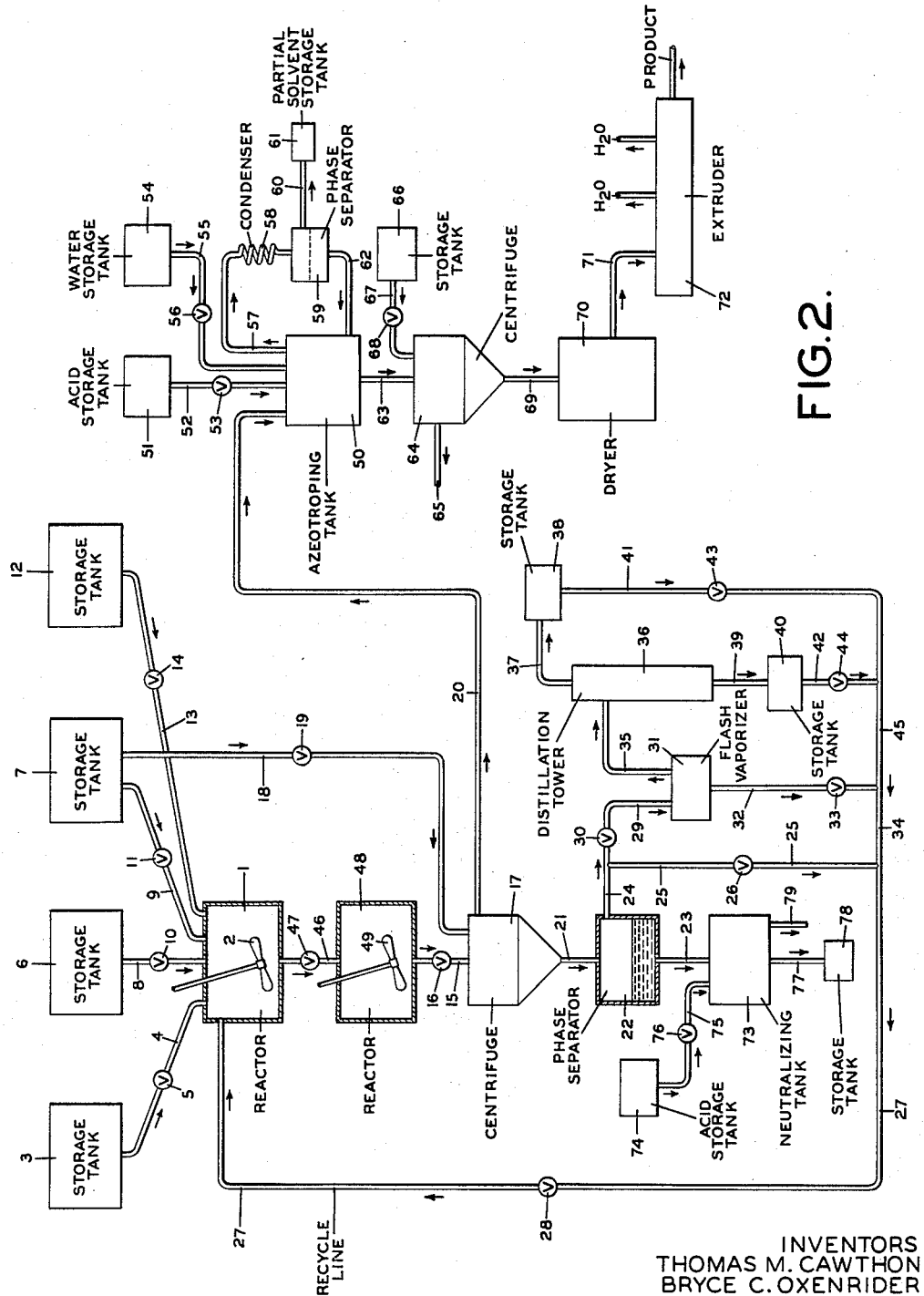

FIGURE 2 is a diagrammatic representation of the process of the present invention incorporating certain process variations.

Referring to FIGURE 1, reactor 1 fitted with stirrer 2 is charged with the desired amount of aqueous alkaline solution of bis-phenol-A from storage tank 3 through line 4 and valve 5. The aqueous alkaline solution of bis-phenol-A may be premixed as shown, or the individual substituents comprising the aqueous alkaline solution may be fed individually in the desired proportion to reactor 1 from separate storage tanks and mixed in the reactor. Reactor 1 is then charged with the desired amount of catalyst and partial solvent from storage tanks 6 and 7 through lines 8 and 9 and valves 10 and 11 respectively. The catalyst is normally a quaternary ammonium compound, such as benzyl triethyl ammonium chloride, and may be fed to the reactor either before or during the reaction. The partial solvent may comprise a single compound or a solvent-non-solvent mixture, as above described. If a solvent-non-solvent mixture is employed individual storage tanks may be used for each component, or the components may be pre-mixed and stored in a single storage tank.

To the stirred mixture the desired quantity of phosgene is introduced from storage tank 12 through line 13 and valve 14. It is preferred to add the phosgene slowly over a period of time, preferably over a period of from 15 minutes to 4 hours, although this is not critical. As the reaction continues polycarbonate of uniform molecular weight slowly precipitates from the alkaline reaction mixture. It is to be understood that in a continuous process the phosgene would be continuously introduced.

In a continuous operation there is normally employed a plurality of reactors rather than the one reactor shown in FIGURE 1, for example, see FIGURE 2 wherein the reaction mixture or a portion thereof is transferred from reactor 1 through line 46, valve 47 to a second reactor 48 fitted with stirrer 49. Alternatively, the second reactor may be designed to complete the consumption of bis-phenol-A by further phosgenating in that reactor. In this procedure a third reactor may be desirable for a post-phosgenation molecular weight growth period. The reason for the use of a plurality of reactors in a continuous operation is that new material is continuously being added to the first reactor and at least one subsequent reactor is necessary for high conversion. In a continuous operation the holding time in each reactor is not critical, but normally varies from 10 minutes to two hours. In a batch operation the reaction times are similarly not critical. A post-phosgenation period is not required in a batch operation, but a post-phosgenation period of up to one hour may aid in obtaining better conversion.

From the reactor the mixture or a portion thereof is transferred through line 15, valve 16 to centrifuge 17 wherein the cake is washed with a fresh portion of partial solvent from storage tank 7 through line 18, valve 19 in order to free low molecular weight polymeric portions from the precipitated polycarbonate. Alternatively, a separate storage tank of partial solvent may be maintained for this purpose.

The precipitated polycarbonate, still wetted with partial solvent, is transferred through line 20 from whence it is purified, for example, by removing inorganic impurities from the crude polymer, feeding to a devolatilizing extruder, and pumping off impurities. Alternatively the crude polymer may be steam distilled free of partial solvent, and the resulting polymer slurry treated with deionized water to remove inorganic impurities. The polymer is then dried and may be extruded, if desired. This alternative method is shown in FIGURE 2 wherein the crude product is transferred through line 20 to an azeotroping tank 50 where it is neutralized and held at about pH 6 with acid from tank 51, line 52, valve 53 and water from tank 54, line 55, valve 56. The crude product is held at about pH 6 in order to neutralize any basic materials present which might cause polymer degradation. Typical acids which may be employed include hydrochloric, carbonic, orthophosphoric, sulfurous, etc. The polymer slurry is then azeotroped free of partial solvent. The azeotropic mixture of water and partial solvent is conducted through line 57, condenser 58 into phase separator 59 wherein the partial solvent is separated from the water, with the partial solvent being drawn off line 60 to storage tank 61 and the water phase returned to the azeotroping tank via valved line 62. The polymer slurry, now free of partial solvent, is then drawn off via line 63 to centrifuge 64 where it is centrifuged free of water and dissolved inorganic impurities which are conducted out of the centrifuge via line 65 and discarded. The cake is treated with deionized water from tank 66, line 67, valve 68 in order to free it of more inorganic impurities which are conducted out of the centrifuge via line 65 dissolved in water. The water wetted cake is transferred via line 69 to vacuum dryer 70, where it is dried, preferably to a water content of one percent or less, and preferably at a temperature of about 120° C. The dried polymer may then be fed via line 71 to degassing extruder 72 which completes the drying step and may optionally feed a pelletizer (not shown). Other methods of purifying the crude polymer will be readily apparent to one skilled in the art.

The filtrate from centrifuge 17 may be transferred through line 21 to a phase separator 22. The aqueous portion is drawn off through line 23. In a continuous, commercial process it may be desirable to recover unreacted bis-phenol-A from the aqueous phase for recycling, for example see FIGURE 2 wherein the aqueous phase is transferred through line 23 to a neutralizing tank 73 where it is neutralized with acid from tank 74, line 75, valve 76. Typical acids which may be employed include hydrochloric, sulfuric, carbonic, etc. Bis-phenol-A precipitates from the aqueous phase upon the addition of acid. The precipitated bis-phenol-A is filtered off through line 77 to storage tank 78 and the waste is drawn off via line 79.

The organic phase may be recycled through lines 24 and 25, valve 26, line 27 and valve 28. Alternatively, some or all of the organic phase may be passed through line 29, valve 30 to a flash vaporizer 31 in order to concentrate the low molecular weight polymer for recycling. The bottoms in the flash vaporizer, comprising the concentrated low molecular weight polymer, are recycled through line 32, valve 33, lines 34 and 27 and valve 28.

The heads from the flash vaporizer are transferred through line 35 to a distillation column 36 where they are further fractionated. The lower boiling portion of the solvent-non-solvent mixture is distilled through line 37 to storage tank 38, and the higher boiling portion passes through line 39 to storage tank 40. If the partial solvent comprises a single compound the further fractionation step is not necessary. The recovered solvent and non-solvent are then passed through lines 41 and 42 and valves 43 and 44 to lines 45 and 34 in order to make up the correct volume and solvent-non-solvent ratio in the recycle mixture.

The phosgene-bis-phenol-A ratio is not critical. Practically, however, at least 0.1 mole of phosgene is employed per mole of bis-phenol-A. Theoretically an equimolar amount of phosgene to bis-phenol-A is required for complete conversion of the bis-phenol-A to polycarbonate; however, to compensate for loss of the phosgene by side reactions the normal operation utilizes slightly more than 1 mole of phosgene per mole of bis-phenol-A. Accordingly, it has been found that the preferred ratio of phosgene to bis-phenol-A is from about 1.1 to 1.5 moles of phosgene per mole of bis-phenol-A. If less than 1 mole of phosgene is employed, correspondingly less of the bis-phenol-A will be converted to polycarbonate. If too much phosgene is employed, the extra phosgene will merely be lost by side reactions or unconsumed.

When all of the bis-phenol-A is added initially it has been found that there is a high ratio of low molecular weight material formed. It is desirable to control the amount of low molecular weight material in the organic phase in order to avoid contaminating the swollen polymer with low molecular weight material. In the preferred embodiment, therefore, where the phosgene is added slowly, the amount of bis-phenol-A present at any one time is controlled by continuous addition simultaneous with the phosgene feed, there being maintained an excess of bis-phenol in the reactor.

The aqueous alkaline solution may be formed from an alkali metal base, preferably employing an excess of base, such as, lithium, sodium, or potassium hydroxide. In the aqueous alkaline solution the alkali metal salt of bis-phenol-A is formed.

It is preferred to employ a catalytic amount of a catalyst for the reaction, with any of the conventional catalysts being applicable. The catalyst is preferably employed in amounts from 0.05 to 5.0 percent based on the bis-phenol-A and it is preferred to employ a quaternary ammonium compound. Typical catalysts include the following: quaternary ammonium compounds such as the halides or hydroxides, for example, benzyl triethyl ammonium chloride, tetramethyl ammonium hydroxide, octadecyl triethyl ammonium chloride, benzyl trimethyl ammonium fluoride, dodecyl trimethyl ammonium chloride, benzyl phenyl dimethyl ammonium chloride, cyclohexyl trimethyl ammonium bromide, etc.; tertiary amines, such as trimethyl amine, dimethyl aniline, diethyl aniline, etc. The use of these and other catalysts for the reaction will be apparent to one skilled in the art.

The temperatures of the reaction may vary within a wide range, that is, the reaction may be conducted at room temperature or lower or higher temperatures as desired. Generally temperatures from the freezing point to the boiling point of the mixture may be utilized. It has been found that there is a tendency for molecular weight increase at higher temperatures.

Various additives may be employed such as antioxidants, and additives to preferentially react with phosgene decomposition products. Typical of such additives are sodium dithionite, potassium bisulfite, carbon monoxide, etc. Potential chain terminators may also be used.

The polycarbonates obtained by the present process have the desirable characteristics of polycarbonate resins. They are easily processed into valuable formed articles or coatings by compression molding, injection molding, extrusion, or flame spraying. The polycarbonates of the present invention can be processed into films and fibers, which can be oriented by stretching. By this stretching operation the strength of these products is considerably increased, while elongation is decreased. The polycarbonates produced by the present process can also be processed in combination with plasticizers or with fillers, such as asbestos or glass fibers. In addition the polycarbonates of the present invention are characterized by having superior flow characteristics than the polycarbonates of the prior art.

The present invention will be further illustrated by consideration of the following examples. In the following examples the molecular weights cited were determined by viscosity measurements of a known concentration of polymer in ethylene chloride by the use of a 60 second Ubbelhode viscosimeter at 30° C. and molecular weight calculated from the following equation wherein $\eta_i$ is viscosity.

$$\eta_i = 1.23 \times 10^{-4} \, MW^{0.83}$$

*Example 1.—Ethylene chloride-isopropylether partial solvent*

A 1500 cubic centimeter resin pot was fitted with a condenser, thermometer, bubbler, baffle and funnel. A four-bladed paddle stirrer was used at 500–700 r.p.m. The reactor was thoroughly flushed with nitrogen and a nitrogen atmosphere was maintained throughout the reaction with a slow bleed. The following ingredients were introduced into the reactor: an aqueous solution of 3.5 grams of sodium hydroxide and 6 grams of bis-phenol-A in 300 cubic centimeters of tap water; 0.1 gram of benzyl triethyl ammonium chloride; and a partial solvent having a C.E.D. of 74 and consisting of 250 cubic centimeters each of ethylene chloride and isopropylether. To this emulsion, maintained at 30° C., was added a concentrated aqueous solution of 25.7 grams of sodium hydroxide, 51 grams of bis-phenol-A and 0.54 gram of benzyl triethyl ammonium chloride (a total of 1.12 percent catalyst based on bis-phenol-A) in 200 cubic centimeters of tap water at 65° C. over a 40 minute period with approximately 21.5 grams of phosgene. Polycarbonate resin precipitated during most of the 40 minute period. The suspended polymer was centrifuged and washed on the centrifuge with 250 cubic centimeters of fresh partial solvent in order to free it of mother liquor.

The crude polymer product, in the form of a centrifuge cake distended with partial solvent, was separated from the reaction mixture and freed of partial solvent by azeotroping with 500 cubic centimeters of water containing 5 cubic centimeters of concentrated hydrochloric acid. The slurry was filtered and washed on the filter with deionized water until the filtrate was pH 6. The polymer was then dried in a vacuum oven. A recovery of 47.6 grams of polycarbonate resin having an average molecular weight of 26,800 was realized.

The following examples illustrate the reproducibility of the system, that is that the process of the present invention may be advantageously utilized to obtain uniform molecular weights. In the following examples the procedure of Example 1 was duplicated except as indicated and the molecular weight of recovered polymer determined.

TABLE 1

| Example | Acid Used in Azeotrope | Molecular Weight |
|---|---|---|
| 2 | Hydrochloric | 27,000 |
| 3 | ___do___ | 29,200 |
| 4 | ___do___ | 28,800 |
| 5 | Orthophosphoric | 28,700 |
| 6 | Hydrochloric | 27,600 |
| 7 | ___do___ | 26,800 |

The following examples illustrate that by modifying the ratios of solvent to non-solvent variation in molecular weight may be obtained. In the following examples the procedure of Example 1 was duplicated except as noted.

TABLE 2

| Example | Solvent to non-Solvent ratio | Acid Used in Azeotrope | Molecular Weight |
|---|---|---|---|
| 8 | 45–55 | Orthophosphoric | 18,200 |
| 9 | 50–50 | Hydrochloric | 27,600 |
| 10 | 52.5–47.5 | Orthophosphoric | 31,400 |
| 11 | 55–45 | ___do___ | 45,100 |

It has been found that the molecular weights may be varied by varying the catalyst concentration. In the following examples the procedure of Example 1 was repeated except as noted.

TABLE 3

| Example | Catalyst Concentration Based on Bis-phenol A | Molecular Weight |
|---|---|---|
| 12 | 0.11 | 15,000 |
| 13 | 0.55 | 25,300 |
| 14 | 1.12 | 27,800 |
| 15 | 2.24 | 37,700 |

The following examples indicate the use of different partial solvents. The procedure employed was identical to the procedure in Example 1 except as noted.

TABLE 4

| Example | Partial Solvent | C.E.D. of Partial Solvent | Catalyst Concentration, Percent | Reaction Temp., °C. | Acid Used in Azeotrope | Molecular Weight |
|---|---|---|---|---|---|---|
| 16 | 50% ethylene chloride–50% isooctane. | 72.98 | 1.12 | 30 | Hydrochloric | 28,300 |
| 17 | 45% ethylene chloride–55% heptane. | 75.8 | 2.0 | 40 | Carbonic | 30,300 |
| 18 | 55% dichlorobutane–45% isooctane. | 70.5 | 1.12 | 40 | ___do___ | 19,600 |
| 19 | 50% benzene–50% isopropylether. | 70.8 | 1.12 | 30 | Hydrochloric | 13,400 |
| 20 | 100% n-butyl chloride | 71.06 | 2.0 | 40 | Carbonic | 17,000 |
| 21 | 100% n-amyl chloride | 70.9 | 2.0 | 40 | ___do___ | 15,000 |

*Example 22.—Comparative example*

A 1500 cubic centimeter resin pot was fitted with a condenser, thermometer, bubbler, baffle and funnel. A four-bladed paddle stirrer was used at 500–700 r.p.m. The reactor was thoroughly flushed with nitrogen and a nitrogen atmosphere was maintained throughout the reaction with a slow bleed; the following ingredients were introduced into the reactor: an aqueous solution of 29.2 grams of sodium hydroxide and 57 grams of bis-phenol-A in 500 cubic centimeters of tap water; 1.28 grams of benzyl triethyl ammonium chloride; and 500 cubic centimeters of ethylene chloride. To this emulsion, maintained at 30° C., phosgene was added over an 80 minute period until all of the bis-phenol was consumed. The polymer solution was washed with 5 cubic centimeters of concentrated hydrochloric acid in 500 cubic centimeters of water. This procedure was repeated and the polymer washed with water until pH 6. The polymer was precipitated from solution by the addition of acetone and methanol, and the resulting polymer had an average molecular weight of about 44,200.

The heterogeneity index of the above polymer was determined by standard procedures. The heterogeneity index is a distributional relationship between the weight average molecular weight and the number average molecular weight. Generally the higher the value the broader the molecular weight distribution. The heterogeneity index of the above polymer was 5.96; whereas the heterogeneity index of the polymer of Example 1 was 2.0, indicating a substantially narrower molecular weight distribution for the polymer of Example 1.

The heterogeneity index was determined by dissolving the polymer in methylene chloride, incrementally adding acetone (precipitating the polymer) and recovering several fractions. The molecular weights of these fractions were determined and plotted versus the weight percentage of these fractions. This gave a distributional curve and from this curve the weight average molecular weight and number average molecular weight were determined in accordance with standard procedures. The ratio of weight average molecular weight to number average molecular weight is the heterogeneity index.

In the foregoing examples it is preferred to conduct the reaction in an inert atmosphere, such as nitrogen, helium, carbon monoxide, etc., since it is thought that phenate salts are very susceptible to oxidation.

The present invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

We claim:

1. A process for the preparation of polycarbonate resins having a uniform, narrow molecular weight distribution which is preselected from within an average molecular weight range of from about 10,000 to 100,000, which comprises forming polycarbonate resin by reacting a mixture consisting essentially of phosgene and 2,2-(4,4'-dihydroxydiphenyl)-propane in an aqueous alkaline medium and in the presence of a water-immiscible partial solvent which is inert under the conditions of reaction and has a cohesive energy density of from about 65 to 82, said partial solvent being a non-solvent for polycarbonate resins having molecular weight of at least about said pre-selected uniform, narrow molecular weight distribution and a solvent for polycarbonate resin having molecular weight of less than about said pre-selected uniform, narrow molecular weight distribution, whereby polycarbonate resin formed having molecular weight of at least about said pre-selected uniform, narrow molecular weight distribution is essentially precipitated from said partial solvent and polycarbonate resin formed having molecular weight of less than about said pre-selected uniform, narrow molecular weight distribution is essentially retained in solution in said partial solvent, and recovering said precipitated polycarbonate resin.

2. A process according to claim 1, wherein the reaction is catalyzed by about 0.05 to 5% by weight of a quaternary ammonium compound based on the weight of the 2,2-(4,4'-dihydroxy-diphenyl)-propane.

3. A process according to claim 1, wherein the phosgene is slowly added to an aqueous alkaline solution of the 2,2-(4,4'-dihydroxy-diphenyl)-propane and the molar ratio of the phosgene to the 2,2-(4,4'-dihydroxy-diphenyl)-propane is between 1.1:1 and 1.5:1.

4. A process according to claim 3, wherein said partial solvent is n-butyl chloride.

5. A process according to claim 1, wherein the process is carried out continuously, the precipitated polycarbonate resin being separated from the liquid phase, and the partial solvent containing dissolved polycarbonate resin being recycled to the polycarbonate resin-forming reaction.

6. A process according to claim 1, wherein the partial solvent comprises a mixture of (1) a liquid having a cohesive energy density of above about 65 and (2) a liquid having a cohesive density of less than about 65, said partial solvent mixture having a cohesive energy density of from about 65 to 82.

7. A process according to claim 6, wherein said partial solvent is a mixture of ethylene chloride and isopropyl-ether.

8. A process according to claim 6, wherein said partial solvent is a mixture of ethylene chloride and isooctane.

9. A process according to claim 6, wherein said partial solvent is a mixture of ethylene chloride and heptane.

10. A process according to claim 6, wherein said partial solvent is a mixture of 1,4-dichlorobutane and isooctane.

References Cited by the Examiner
UNITED STATES PATENTS

| | | | |
|---|---|---|---|
| 2,964,794 | 12/1960 | Peilstocker et al. | 260—47 |
| 3,065,204 | 11/1962 | Dietrich et al. | 260—47 X |
| 3,133,044 | 5/1964 | Allen et al. | 260—47 X |

FOREIGN PATENTS

| | | |
|---|---|---|
| 1,178,682 | 5/1959 | France. |

WILLIAM H. SHORT, *Primary Examiner.*